(12) United States Patent
Byoun

(10) Patent No.: US 11,081,988 B1
(45) Date of Patent: Aug. 3, 2021

(54) DATA STORAGE DEVICE WITH SPREAD SPECTRUM SPINDLE MOTOR CONTROL

(71) Applicant: Western Digital Technologies, Inc., San Jose, CA (US)

(72) Inventor: Jaesoo Byoun, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 8 days.

(21) Appl. No.: 16/801,375

(22) Filed: Feb. 26, 2020

(51) Int. Cl.
*H02P 7/29* (2016.01)
*G11B 19/28* (2006.01)

(52) U.S. Cl.
CPC ............ *H02P 7/2913* (2013.01); *G11B 19/28* (2013.01)

(58) Field of Classification Search
CPC ........ G05B 11/28; H02K 21/00; H02K 23/00; H02K 31/00; H02P 1/00; H02P 1/04; H02P 1/12; H02P 1/14; H02P 1/46; H02P 7/29; H02P 1/42; H02P 3/00; H02P 6/00; H02P 6/08; H02P 6/24; H02P 1/24; H02P 6/06; H02P 6/17; H02P 6/157; H02P 6/15; H02P 6/14; H02P 7/00; H02P 7/025; H02P 7/03; H02P 7/06; H02P 7/2815; H02P 7/2913; H02P 7/30; H02P 7/325; H02P 23/00; H02P 27/00; H02P 27/085; H02P 27/08
See application file for complete search history.

(56) References Cited

U.S. PATENT DOCUMENTS

| | | | | |
|---|---|---|---|---|
| 5,847,521 | A * | 12/1998 | Morikawa | H02P 6/085 318/400.01 |
| 5,986,426 | A * | 11/1999 | Rowan | G11B 23/0007 318/599 |
| 6,433,507 | B1 | 8/2002 | Makaran et al. | |
| 6,754,027 | B2 * | 6/2004 | Hirano | G11B 21/22 360/75 |
| 6,995,537 | B1 * | 2/2006 | Plutowski | G11B 5/5565 318/400.04 |
| 7,012,396 | B1 | 3/2006 | Brenden et al. | |
| 7,119,508 | B2 * | 10/2006 | Kurosawa | H02P 6/28 318/400.04 |
| 8,558,497 | B2 | 10/2013 | Wright | |
| 8,569,983 | B2 | 10/2013 | Kurosawa et al. | |
| 8,963,455 | B2 * | 2/2015 | Kurosawa | H02P 25/034 318/135 |
| 9,503,011 | B2 * | 11/2016 | Kurosawa | H02P 6/10 |

* cited by examiner

*Primary Examiner* — Antony M Paul

(57) ABSTRACT

A data storage device is disclosed comprising a head actuated over a disk, and a spindle motor configured to rotate the disk. A pulse width modulated (PWM) control signal is generated having a frequency based on a PWM clock, the spindle motor is controlled using the PWM control signal, and a frequency of the PWM clock is swung between a minimum frequency and a maximum frequency at a swing rate.

20 Claims, 5 Drawing Sheets

DATA STORAGE DEVICE WITH SPREAD SPECTRUM SPINDLE MOTOR CONTROL

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
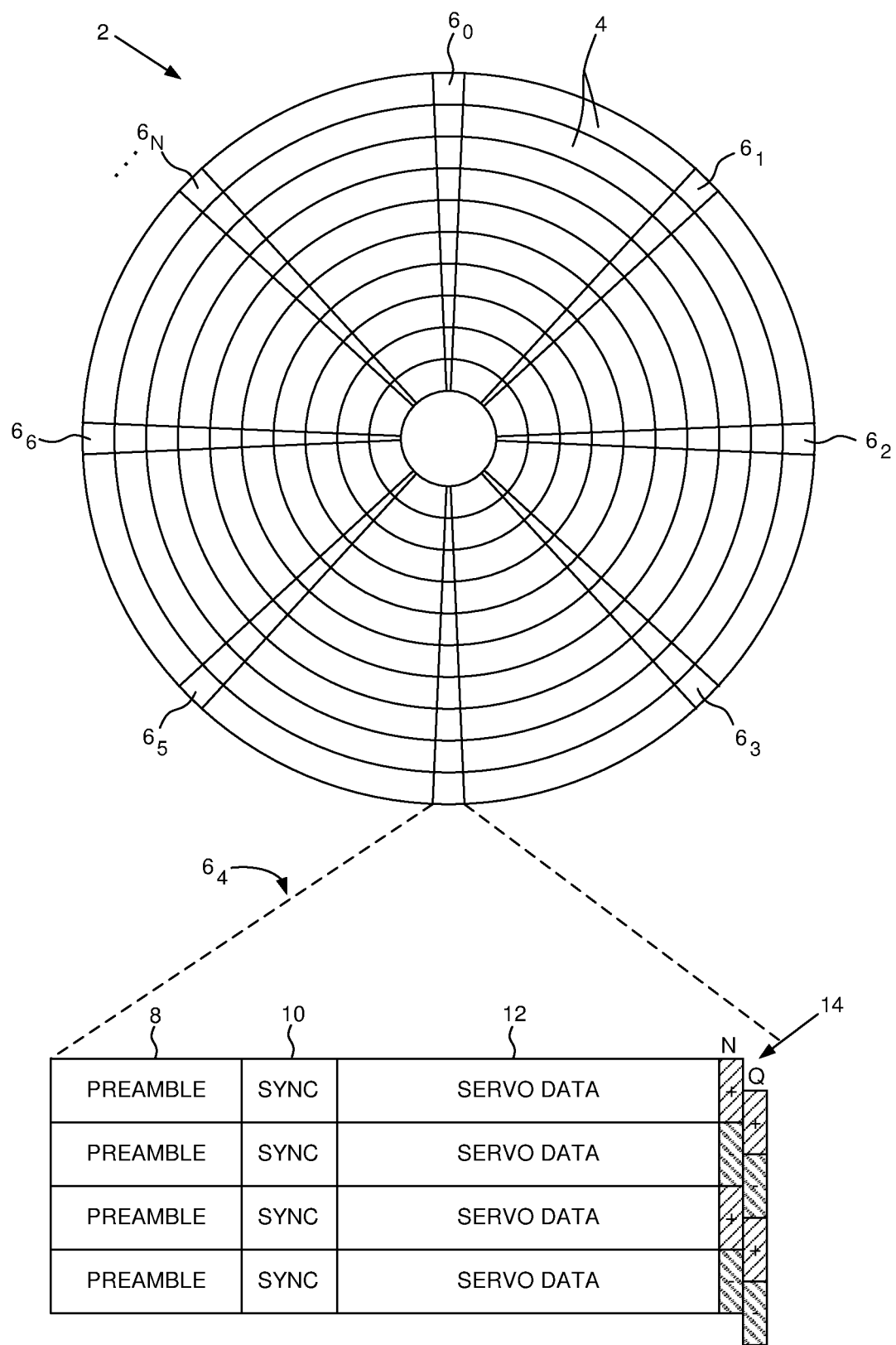
FIG. 1 shows a prior art disk format comprising a plurality of servo tracks defined by servo sectors.
Figure 2A:
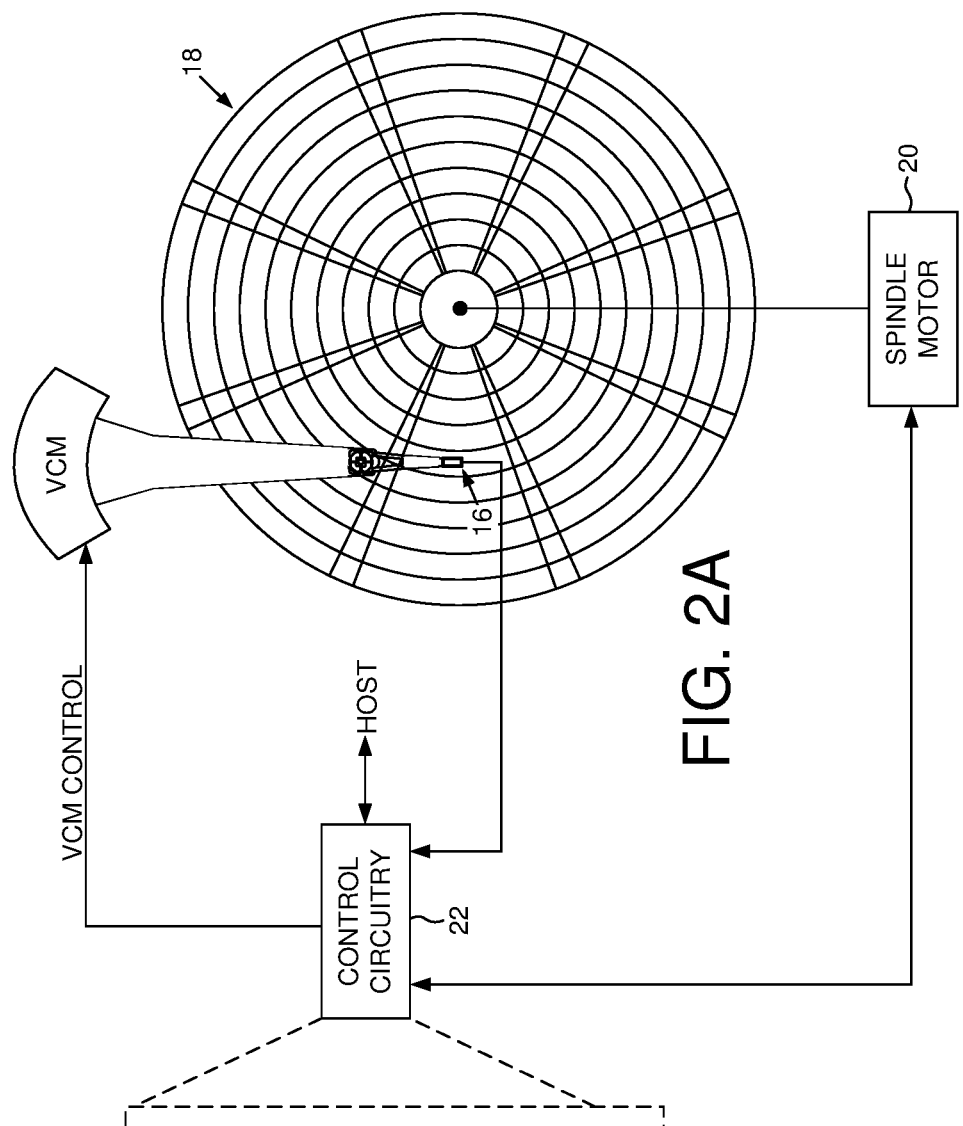
FIG. 2A shows a data storage device in the form of a disk drive according to an embodiment comprising a head actuated over a disk and a spindle motor configured to rotate the disk.
Figure 2B:
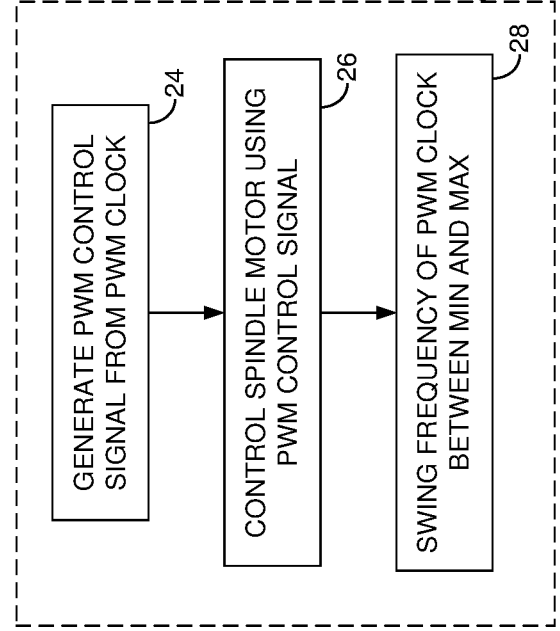
FIG. 2B is a flow diagram according to an embodiment wherein a spindle motor pulse width modulated (PWM) control signal is generated from a PWM clock while swinging a frequency of the PWM clock between a minimum and a maximum.

FIG. 2A shows a data storage device in the form of a disk drive according to an embodiment comprising a head 16 actuated over a disk 18, a spindle motor 20 configured to rotate the disk 18, and control circuitry 22 configured to execute the flow diagram of FIG. 2B. A pulse width modulated (PWM) control signal is generated having a frequency based on a PWM clock (block 24), wherein the spindle motor is controlled using the PWM control signal (block 26), and a frequency of the PWM clock is swung between a minimum frequency and a maximum frequency at a swing rate (block 28).

Figure 3:
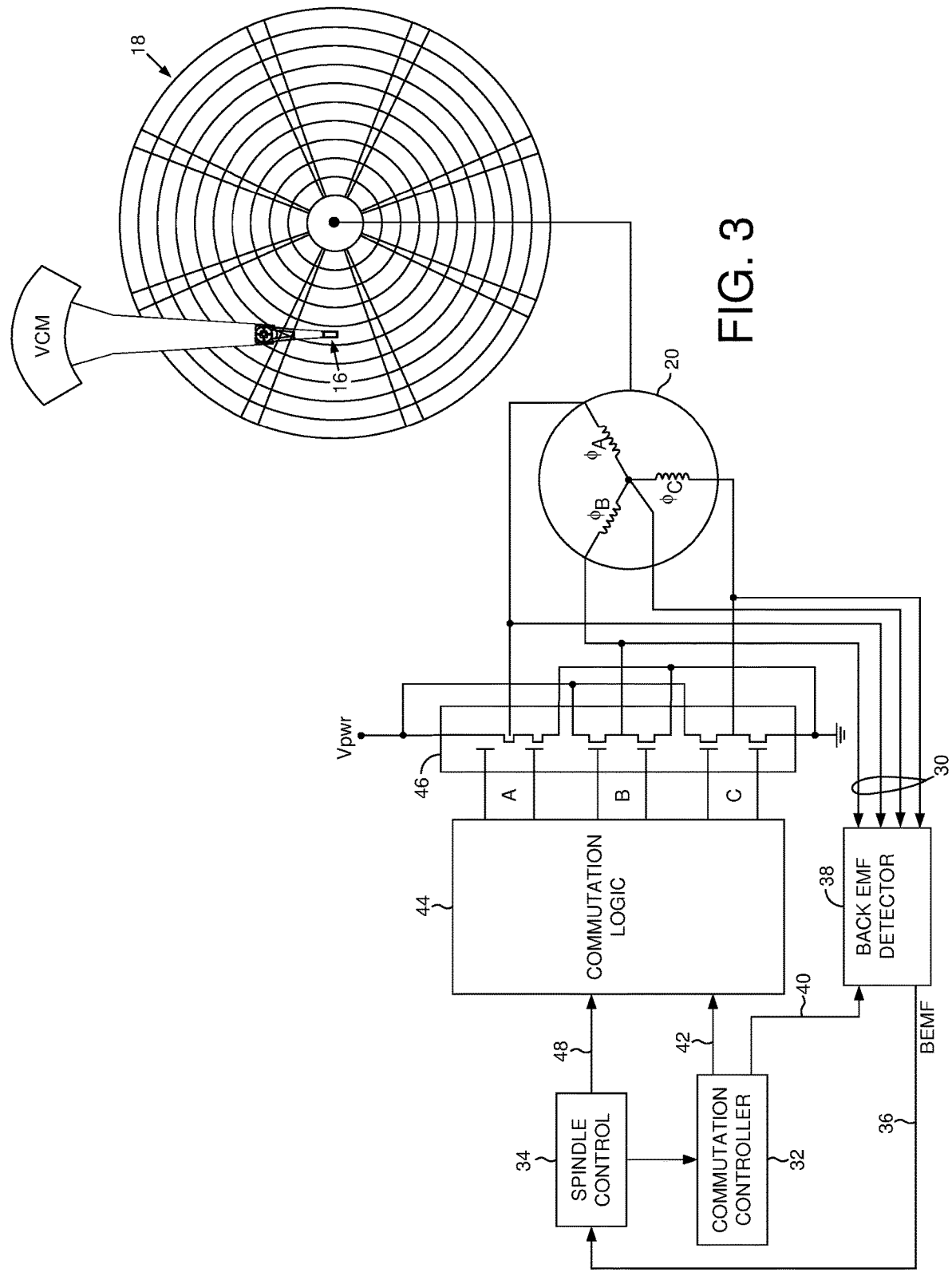
FIG. 3 shows control circuitry according to an embodiment for commutating windings of the spindle motor.

FIG. 3 shows control circuitry according to an embodiment wherein a back electromotive force (BEMF) voltage 30 generated by windings of the spindle motor 20 may be processed in order to drive the commutation sequence of a commutation controller 32. A spindle control block 34 may process a BEMF signal 36 which may be a square wave representing the BEMF zero-crossings as detected by a BEMF detector 38. The commutation controller 32 may generate a control signal 40 which configures the BEMF detector 38 to detect the zero-crossing of the BEMF voltage generated by each winding as the disk rotates. The commutation controller 32 also generates a control signal 42 applied to commutation logic 44. In the embodiment of FIG. 3, the commutation logic 44 is configured by the control signal 42 to control the state of switches 46 in order to drive the windings with voltage Vpwr. In one embodiment, the commutation logic 44 may drive the switches 46 using pulse width modulation (PWM), such as using square wave PWM, trapezoidal PWM, or sinusoidal PWM. Regardless as to how the windings are driven, the commutation controller 32 generates the control signal 42 so that the windings are commutated at the correct periods, thereby generating the desired rotating magnetic field that causes the spindle motor to rotate. In one embodiment, the spindle control block 34 may generate a speed command 48 that controls the effective amplitude of the periodic driving voltage applied to the windings, thereby controlling the speed of the spindle motor 20.

A servo control system in the control circuitry 22 for maintaining the head 16 along the centerline of a data track during an access operation may be adversely affected by disturbances, such as repeatable runout (RRO) and non-repeatable runout (NRRO). RRO is a periodic disturbance that repeats at any given circumferential position of the head as the disk rotates. An example of RRO is a resonance mode of the spindle motor 20 which may induce a periodic wobble as the disk rotates. Mechanical modes of the spindle motor 20, such as imperfections in the bearings, may also induce a NRRO disturbance in the head's servo control system (i.e., a random disturbance that may be spread over a range of frequencies).

Figure 4:
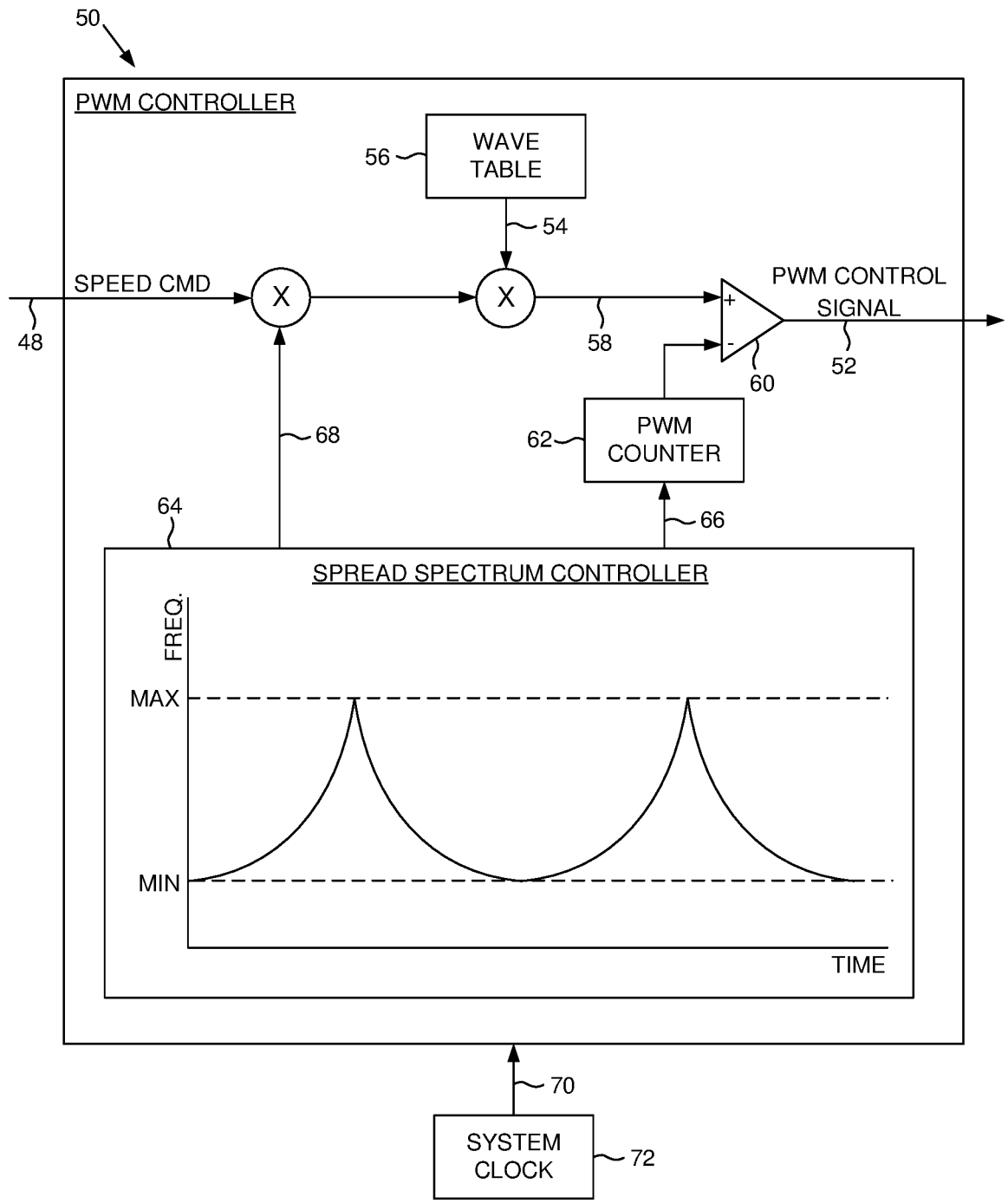
FIG. 4 shows control circuitry according to an embodiment comprising a spread spectrum controller configured to swing a frequency of a spindle motor PWM control signal.

In one embodiment in order to reduce both the RRO and NRRO disturbances caused by the spindle motor 20, a frequency of the spindle motor PWM control signal is swung between a minimum and maximum, thereby implementing a spread spectrum control of the spindle motor 20. FIG. 4 shows an example of this embodiment wherein a PWM controller 50 within the commutation logic 44 of FIG. 3 generates a PWM control signal 52 for controlling the switches 46. In this embodiment, the speed command 48 generated by the spindle control block 34 of FIG. 3 scales a sinewave 54 generated by a sinewave table 56, wherein the scaled sinewave 58 is compared at comparator 60 to the output of a PWM counter 62 in order to generate the PWM control signal 52. That is, the output of the comparator 60 is in a high state when the scaled sinewave 58 is greater than the output of the PWM counter 62, and is in a low state otherwise. The PWM counter 62 cycles the count value from zero to a target threshold, thereby generating a sawtooth waveform. In this manner, the period of the PWM counter 62 establishes a period of the PWM control signal 52, and the scaled sinewave 58 establishes a duty cycle of the PWM control signal 52. In the embodiment of FIG. 4, a spread spectrum controller 64 generates a PWM clock 66 for clocking the PWM counter 62. The frequency of the PWM clock 66 thereby establishes the frequency of the PWM counter 62 in units of time. In one embodiment, the spread spectrum controller 64 swings the PWM clock 66 between a minimum and maximum value in order to "spread" the frequency of the PWM control signal 52, thereby attenuating the RRO and NRRO disturbances adversely affecting the head positioning servo control system. In the embodiment of FIG. 4, the spread spectrum controller 64 also generates a scalar signal 68 for scaling the amplitude of the speed command 48 linearly with the changing frequency of the PWM control signal 52, thereby maintaining the desired duty cycle as the frequency of the PWM control signal 52 changes. That is, the scalar signal 68 scales the speed command 48 so that changing the frequency of the PWM control signal 52 does not change the duty cycle.

In the embodiment of FIG. 4, the frequency of the PWM control signal 52 is adjusted linearly over time meaning the frequency of the PWM control signal 52 swings between a minimum and maximum as a triangle wave. Since the frequency of the PWM clock 66 configures the period of the PWM counter 62, in the embodiment of FIG. 4 the frequency of the PWM clock 66 swings between the minimum and maximum at a rate of $f=1/T$ where T represents the period of the PWM control signal 52 (i.e., the frequency of the PWM clock 66 follows a multiplicative inverse waveform as shown in FIG. 4). In other embodiments, the spread spectrum controller 64 may be configured to swing the frequency of the PWM control signal 52 between the minimum and maximum based on any suitable function (i.e., different from a linear function). For example, in one embodiment the period of the PWM control signal 52 may be adjusted linearly to follow a triangle waveform such that the frequency of the PWM control signal 52 follows a multiplicative inverse waveform.

Figure 5:
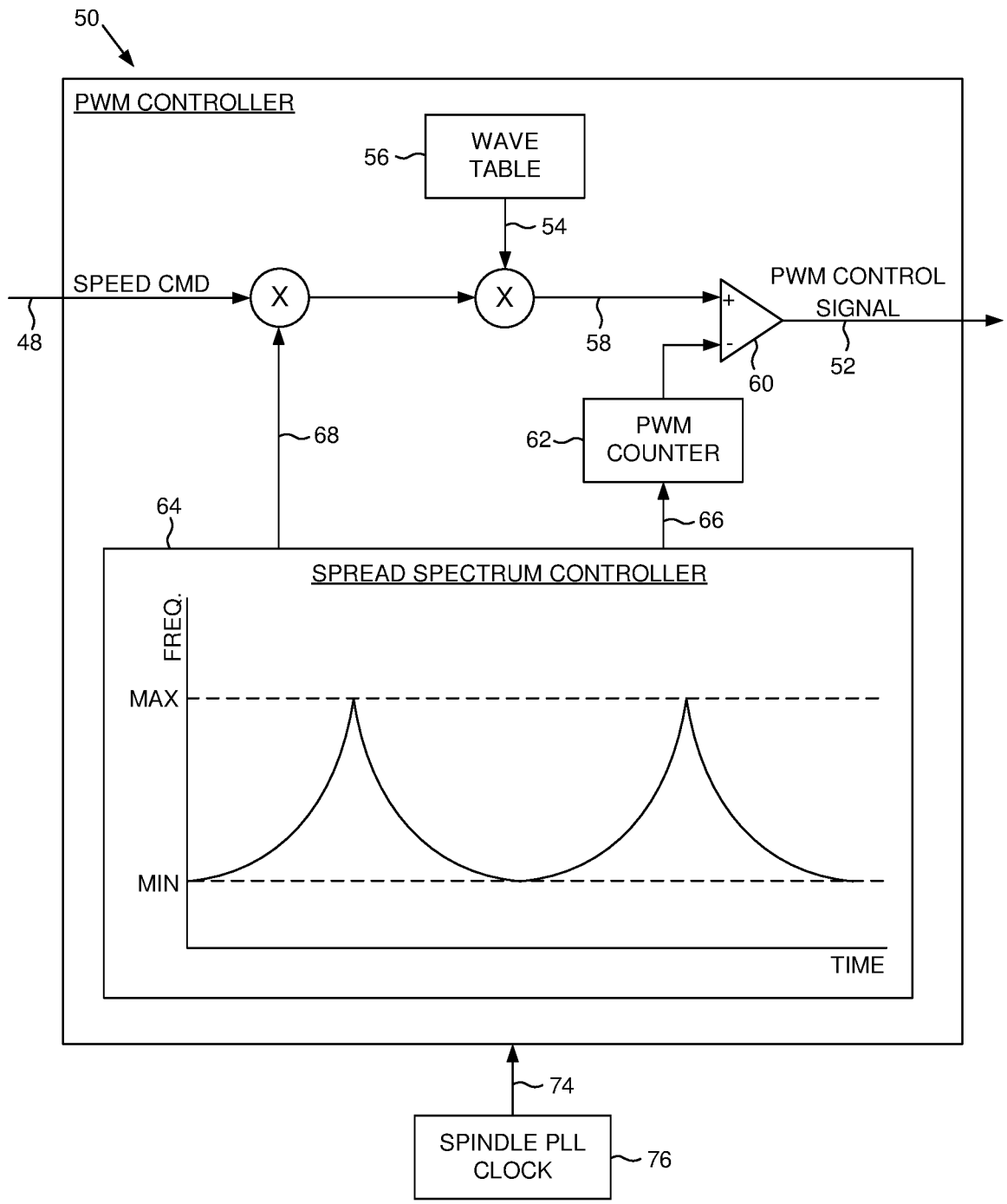
FIG. 5 shows control circuitry according to an embodiment wherein the system clock used to generate the spindle motor PWM control signal is synchronized to a rotation frequency of the spindle motor.

In the embodiment of FIG. 4, the components within the PWM controller 50 are clocked by a fixed system clock 70 generated by any suitable fixed clock generator 72, such as a crystal oscillator. In this embodiment, the time base of the PWM controller 50 remains fixed meaning the compensating effect of the spread spectrum controller 64 remains stationary even though the disturbance frequencies of the spindle motor may be shifting as the rotation frequency of the spindle motor varies over time. In alternative embodiment shown in FIG. 5, the components within the PWM controller 50 may be clocked with a variable system clock 74 that is synchronized to the rotation frequency of the spindle motor in order to track the disturbance frequencies of the spindle motor as the rotation frequency changes (thereby improving the RRO and NRRO attenuation efficacy of the spread spectrum controller 64). The variable system clock 74 may be generated in any suitable manner, wherein in the embodiment of FIG. 5 the variable system clock 74 is generated by a phase-locked-loop (PLL) 76 that is synchronized to the rotation frequency of the spindle motor (e.g., a PLL for generating the BEMF signal 36 of FIG. 3).

In the embodiments described above, the PWM control signal 52 may be generated at any suitable base frequency relative to a target rotation frequency of the spindle motor. In addition, the frequency of the PWM control signal 52 may swing between any suitable minimum and maximum frequencies. For example, in one embodiment a target rotation frequency of the spindle motor may be 7200 RPM wherein swinging the frequency of the PWM control signal 52 may result in a swing of the rotation frequency in a range that is a predetermined percentage of the target rotation frequency (e.g., a predetermined percentage that is in a range of one to five percent of the target rotation frequency). The frequency of the PWM control signal 52 may also swing between the minimum and maximum frequency at any suitable swing rate. In one embodiment, the swing rate is relatively slow such as by changing at a rate of 0.1 Hz for every ten revolutions of the spindle motor.

In one embodiment, at least certain parameters of the PWM controller 50 may be calibrated based on a measured performance of the spindle motor. For example, in some embodiments one or more of the frequency of the PWM clock 66, the minimum and maximum swing frequencies, or the swing rate of the swing frequency may be calibrated based on a measured performance of the spindle motor. In one embodiment, one or more parameters may be adjusted, for example, while measuring the RRO and NRRO disturbances affecting the head's servo control system. The parameter settings that minimizes the RRO and NRRO disturbances may then be selected as the operating settings. In yet another embodiment, one or more parameters of the PWM controller 50 may be adapted in real time, such as by adjusting one or more parameters in response to a real time measurement of the RRO and/or NRRO disturbances.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a head actuated over the disk;
    a spindle motor configured to rotate the disk; and
    control circuitry configured to:
        generate a pulse width modulated (PWM) control signal having a frequency based on a PWM clock;
        control the spindle motor using the PWM control signal; and
        swing a frequency of the PWM clock between a minimum frequency and a maximum frequency at a swing rate.

2. The data storage device as recited in claim 1, wherein the swing rate is determined based on a system clock.

3. The data storage device as recited in claim 1, wherein the control circuitry is further configured to:
    measure a performance of the data storage device; and
    configure the minimum frequency and the maximum frequency based on the measured performance.

4. The data storage device as recited in claim 1, wherein the control circuitry is further configured to:
    measure a performance of the data storage device; and
    configure the swing rate based on the measured performance.

5. The data storage device as recited in claim 1, wherein the control circuitry is further configured to synchronize the PWM clock to a rotation frequency of the spindle motor.

6. The data storage device as recited in claim 1, wherein the control circuitry is further configured to:
    generate a speed command for the spindle motor;
    scale the speed command based on the frequency of the PWM clock; and
    generate the PWM control signal based on the scaled speed command.

7. The data storage device as recited in claim 6, wherein scaling the speed command maintains a target duty cycle of the PWM control signal corresponding to the speed command as the frequency of the PWM clock swings between the minimum frequency and the maximum frequency.

8. The data storage device as recited in claim 1, wherein the control circuitry is further configured to:
    control the spindle motor to rotate the disk at a rotation frequency; and
    swing the frequency of the PWM clock in order to swing the rotation frequency below and above a target rotation frequency by a predetermined percentage of the target rotation frequency.

9. The data storage device as recited in claim 8, wherein the predetermined percentage is in the range of one percent to five percent of the target rotation frequency.

10. Control circuitry configured to:
    clock a modulator with a modulation clock to generate a modulated control signal;
    control switching circuitry of a spindle motor using the modulated control signal; and
    swing a frequency of the modulation clock between a minimum frequency and a maximum frequency at a swing rate.

11. The control circuitry as recited in claim 10, wherein the modulator is a pulse width modulator (PWM) and the modulated control signal is a PWM control signal.

12. The control circuitry as recited in claim 11, wherein the control circuitry is further configured to:
    generate a speed command for the spindle motor;
    scale the speed command based on the frequency of the modulation clock; and
    generate the PWM control signal based on the scaled speed command.

13. The control circuitry as recited in claim 12, wherein scaling the speed command maintains a target duty cycle of the PWM control signal corresponding to the speed command as the frequency of the modulation clock swings between the minimum frequency and the maximum frequency.

14. The control circuitry as recited in claim 10, wherein the swing rate is based on a system clock.

15. The control circuitry as recited in claim 10, wherein the control circuitry is further configured to:
    measure a performance of the data storage device; and
    configure the minimum frequency and the maximum frequency based on the measured performance.

16. The control circuitry as recited in claim 10, wherein the control circuitry is further configured to:
    measure a performance of a data storage device coupled to the control circuitry; and
    configure the swing rate based on the measured performance.

17. The control circuitry as recited in claim 10, wherein the control circuitry is further configured to synchronize the modulation clock to a rotation frequency of the spindle motor.

18. The control circuitry as recited in claim 10, wherein the control circuitry is further configured to:
- control the spindle motor to rotate at a rotation frequency; and
- swing the frequency of the modulation clock in order to swing the rotation frequency below and above a target rotation frequency by a predetermined percentage of the target rotation frequency.

19. The control circuitry as recited in claim 18, wherein the predetermined percentage is in the range of one percent to five percent of the target rotation frequency.

20. A data storage device comprising:
- a disk;
- a head actuated over the disk;
- a spindle motor configured to rotate the disk;
- a means for generating a pulse width modulated (PWM) control signal having a frequency based on a PWM clock;
- a means for controlling the spindle motor using the PWM control signal; and
- a means for swinging a frequency of the PWM clock between a minimum frequency and a maximum frequency at a swing rate.

* * * * *